(12) United States Patent
Tuttle

(10) Patent No.: US 8,991,274 B2
(45) Date of Patent: Mar. 31, 2015

(54) MOUNTING SURFACE OF AN AGRICULTURAL WORK VEHICLE POWER TAKEOFF SYSTEM

(71) Applicant: CNH America LLC, New Holland, PA (US)

(72) Inventor: Thomas B. Tuttle, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/927,938

(22) Filed: Jun. 26, 2013

(65) Prior Publication Data

US 2014/0007715 A1 Jan. 9, 2014

Related U.S. Application Data

(60) Provisional application No. 61/668,570, filed on Jul. 6, 2012.

(51) Int. Cl.
| | |
|---|---|
| *B60K 17/28* | (2006.01) |
| *B60K 25/00* | (2006.01) |
| *A01B 61/02* | (2006.01) |
| *F16D 1/10* | (2006.01) |
| *F16D 1/06* | (2006.01) |

(52) U.S. Cl.
CPC ............ *B60K 25/00* (2013.01); *A01B 61/025* (2013.01); *B60K 17/28* (2013.01); *F16D 1/10* (2013.01); *F16D 2001/062* (2013.01); *F16D 2001/103* (2013.01); *B60Y 2200/22* (2013.01); *B60Y 2200/221* (2013.01)
USPC .................................. 74/11; 180/53.1; 403/1

(58) Field of Classification Search
CPC ........ B60K 17/28; B60K 25/06; B60W 10/30
USPC ................. 74/11; 180/53.1, 53.4, 53.8; 403/1
See application file for complete search history.

(56) References Cited

U.S. PATENT DOCUMENTS

| | | | |
|---|---|---|---|
| 4,479,395 A | 10/1984 | Riley | |
| 4,610,175 A * | 9/1986 | Weis et al. | 74/15.86 |
| 4,824,334 A * | 4/1989 | Ramsay | 417/360 |
| 5,070,982 A * | 12/1991 | Pitchford | 192/69.9 |
| 5,364,310 A * | 11/1994 | Taylor | 464/170 |
| 5,458,100 A * | 10/1995 | Neuenfeld | 123/195 A |
| 5,645,363 A | 7/1997 | Dafforn et al. | |
| 5,765,650 A | 6/1998 | Checkel | |

(Continued)

OTHER PUBLICATIONS http://www.bendix.com/media/documents/products_1/compressorsgovernors_1/ba922customerbookletlatest.pdf, Feb. 2012.

(Continued)

*Primary Examiner* — Paul N Dickson
*Assistant Examiner* — Laura Freedman
(74) *Attorney, Agent, or Firm* — Sue C. Watson

(57) ABSTRACT

A mounting surface of an agricultural work vehicle power takeoff system. In one example, an agricultural vehicle includes a power takeoff (PTO) device. The PTO device includes a drive shaft and a mounting surface. Furthermore, the mounting surface includes a plurality of threaded apertures for coupling an auxiliary system to the PTO device, and a pilot configured to engage with a complimentary pilot of the auxiliary system to facilitate alignment of the PTO device with the auxiliary system. The mounting surface and the auxiliary system have the same mounting configuration.

10 Claims, 4 Drawing Sheets

(56) References Cited

U.S. PATENT DOCUMENTS

| | | | |
|---|---|---|---|
| 5,913,547 A * | 6/1999 | Fernandez | 29/525.02 |
| 6,036,452 A * | 3/2000 | Huang | 417/360 |
| 6,224,289 B1 * | 5/2001 | Redd et al. | 403/337 |
| 6,409,457 B1 | 6/2002 | Korycan et al. | |
| 6,499,548 B2 | 12/2002 | Wesley | |
| 7,237,496 B2 | 7/2007 | Bettin et al. | |
| 7,938,631 B2 * | 5/2011 | Lisi et al. | 417/360 |
| 2010/0101810 A1 | 4/2010 | Harnetiaux et al. | |
| 2011/0162466 A1 | 7/2011 | Hillyer et al. | |
| 2012/0011948 A1 * | 1/2012 | Harkcom | 74/11 |
| 2012/0207538 A1 * | 8/2012 | Rizk | 403/315 |

OTHER PUBLICATIONS http://www/quickattach.com/shop-by-department/compact-tractors/hydraulic-power-units/products/power-pack/, Feb. 2012.
http://www.idahoimplement.com/tractor-implements-and-accessories/tractor-pto-hydraulic-power-units/lorenz-pto-driven-hydraulic-pump-and-storage-tank.html#product_description, Feb. 2012.
http://www.trunkpump.com/Local/product-pto-pumps.htm, Feb. 2012.

* cited by examiner

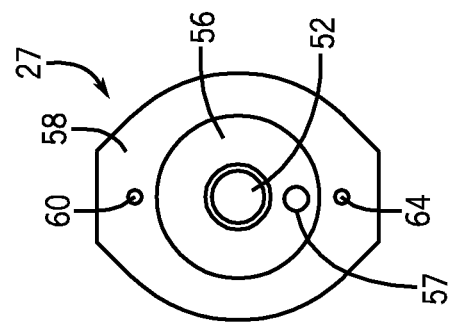
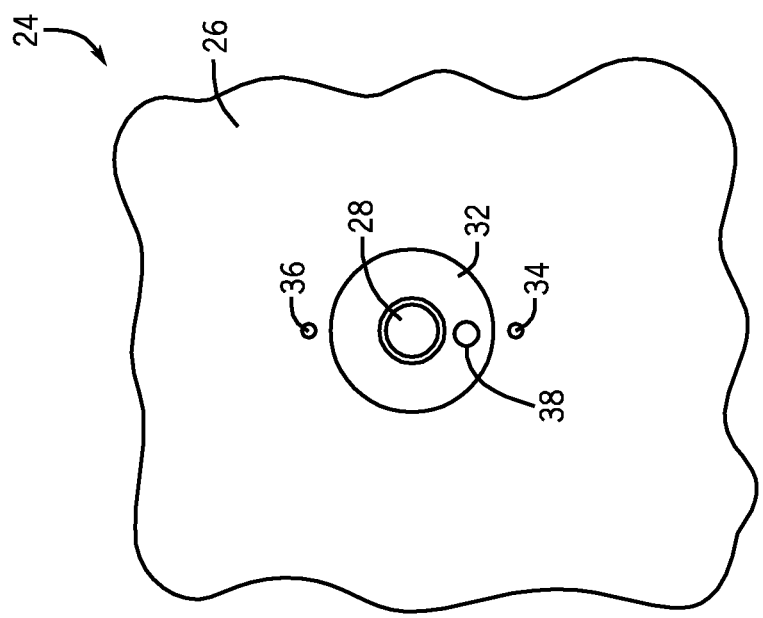

MOUNTING SURFACE OF AN AGRICULTURAL WORK VEHICLE POWER TAKEOFF SYSTEM

RELATED APPLICATION

This application benefits from the priority of U.S. Provisional Patent Application No. 61/668,570, entitled "Mounting Surface of an Agricultural Work Vehicle Power Takeoff System," filed Jul. 6, 2012, which is hereby incorporated by reference in its entirety.

BACKGROUND

The invention relates generally to agricultural work vehicles, such as tractors, and more particularly to a mounting surface of a power takeoff system of an agricultural work vehicle.

A power takeoff system (e.g., drive system) generally uses energy from an engine to power devices attached to the power takeoff system. Agricultural work vehicles, such as tractors, may include one or more power takeoff systems. For example, an agricultural work vehicle may include a power takeoff system having a drive shaft at a rear end of the vehicle that provides a rotational output for operating an agricultural implement or an auxiliary system (e.g., a hydraulic pump, a generator, an air compressor, a water pump, etc.).

Coupling an auxiliary system to a power takeoff system of an agricultural work vehicle may provide various challenges. For example, the weight of an auxiliary system may use a number of mounting structures (e.g., brackets, clamps, pins, bolts, etc.) to attach the auxiliary system to the agricultural work vehicle to stabilize and support the auxiliary system. Furthermore, the auxiliary system may be aligned with the power takeoff system using additional mounting structures (e.g., brackets, clamps, pins, bolts, etc.). Multiple mounting structures increase the time and cost for coupling the auxiliary system to the power takeoff system.

BRIEF DESCRIPTION

In one embodiment, an agricultural vehicle includes a power takeoff (PTO) device. The PTO device includes a drive shaft and a mounting surface. Furthermore, the mounting surface includes a plurality of threaded apertures for coupling an auxiliary system to the PTO device. The mounting surface also includes a pilot configured to engage with a complimentary pilot of the auxiliary system to facilitate alignment of the PTO device with the auxiliary system. The mounting surface and the auxiliary system have the same mounting configuration.

In another embodiment, a power takeoff (PTO) system for an agricultural vehicle includes a drive shaft. The PTO system also includes a mounting surface having a plurality of threaded apertures for coupling an auxiliary system to the PTO system. The mounting surface also includes a pilot configured to engage with a complimentary pilot of the auxiliary system to facilitate alignment of the PTO system with the auxiliary system. The mounting surface and the auxiliary system have the same mounting configuration. The PTO system also includes a PTO shaft adaptor coupled to the drive shaft and configured to be coupled to a driven shaft of the auxiliary system.

In another embodiment, a power takeoff (PTO) device for an agricultural vehicle includes a drive shaft and a mounting surface having a plurality of threaded apertures for coupling an auxiliary system to the PTO device. The mounting surface also includes a pilot configured to engage with a complimentary pilot of the auxiliary system to facilitate alignment of the PTO device with the auxiliary system. The mounting surface and the auxiliary system have the same mounting configuration.

DRAWINGS

These and other features, aspects, and advantages of the present invention will become better understood when the following detailed description is read with reference to the accompanying drawings in which like characters represent like parts throughout the drawings, wherein:

FIG. 5 is a back view of an embodiment of a two bolt mounting surface of a power takeoff system in accordance with the present disclosure; and FIG. 6 is a front view of an embodiment of a two bolt mounting structure of an auxiliary system in accordance with the present disclosure.

DETAILED DESCRIPTION

Figure 1:
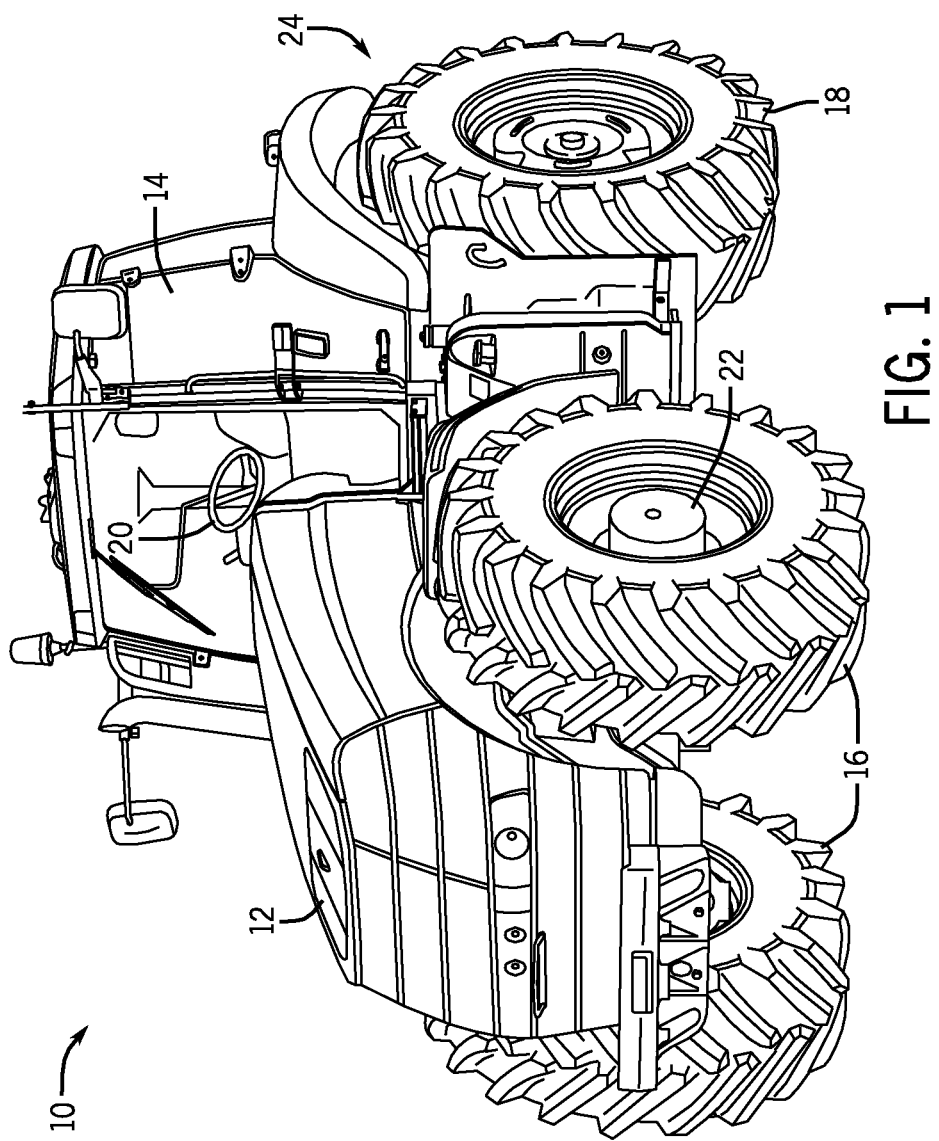
FIG. 1 is a perspective view of an embodiment of an agricultural work vehicle that may employ one or more power takeoff systems in accordance with the present disclosure.

FIG. 1 is a perspective view of an agricultural work vehicle 10 that employs one or more power takeoff systems. In certain embodiments, the agricultural work vehicle 10 may be a tractor, off-road vehicle, work vehicle, or any other suitable vehicle that may incorporate one or more power takeoff systems. The illustrated vehicle 10 has a body 12 that houses an engine, transmission, cooling system, and power train (not separately shown). The body 12 may also house portions of a front mounted power takeoff system. Further, the agricultural work vehicle 10 has a cabin 14 where an operator may sit or stand to operate the vehicle 10. Moreover, the vehicle 10 has two front wheels 16 and two rear wheels 18 that rotate to move the vehicle 10. As will be appreciated, the vehicle 10 is maneuvered using a steering wheel 20 that causes the front wheels 16 to turn. As illustrated, the wheels 16 are coupled to an axle 22 (e.g., fixed or suspended) that supports the wheels 16, and facilitates wheel rotation. Although a work vehicle 10 having wheels 16 and 18 is illustrated, in certain embodiments, a track system (e.g., or another system) may be used to move the vehicle 10. A rear mounted power takeoff (PTO) system 24 is mounted to the rear of the agricultural work vehicle 10, and is used for driving moving parts of an implement or auxiliary system coupled to the rear of the agricultural work vehicle 10. As explained in detail below, the PTO system 24 includes a mounting surface that is configured to enable an auxiliary system to be directly mounted thereon, thereby obviating additional mounting structures (e.g., brackets, clamps, etc.).

Figure 2:
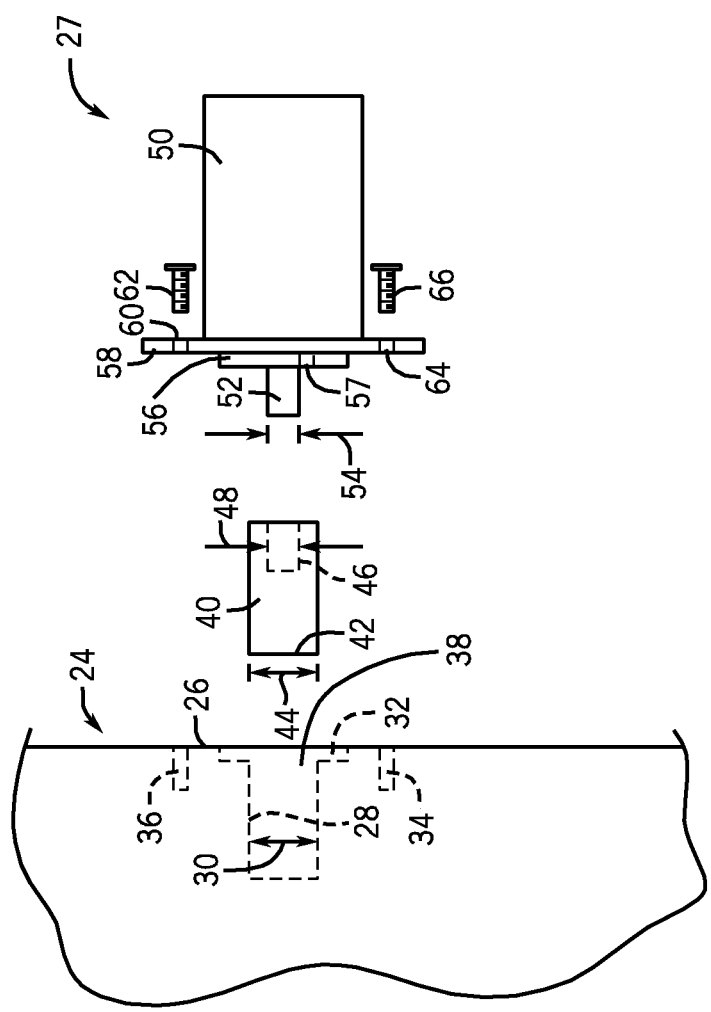
FIG. 2 is a side view of an embodiment of a power takeoff system having a mounting surface for mounting an auxiliary system to the power takeoff system in accordance with the present disclosure.

FIG. 2 is a side view of an embodiment of the PTO system 24 (e.g., PTO device) having a mounting surface 26 for mounting an auxiliary system 27 to the PTO system 24. The PTO system 24 includes a drive shaft 28 to provide rotational energy to drive the auxiliary system 27 when coupled thereto. As may be appreciated, the drive shaft 28 may be female as illustrated, or male, depending on the configuration of the power takeoff system 24. Furthermore, the drive shaft 28 may be splined in a manner suitable for gripping a mating splined shaft. As illustrated, the drive shaft 28 has an opening with a diameter 30 for driving a mating drive shaft having the same diameter. The diameter 30 may be any suitable size (e.g., approximately 1¾ inches, 1⅜ inches, etc.).

The mounting surface 26 includes a pilot 32 that is used to facilitate lateral alignment of the PTO system 24 with the auxiliary system 27. As such, the pilot 32 is configured to engage with a complimentary pilot of the auxiliary system 27. Accordingly, the pilot 32 may be any suitable size. As illustrated, the pilot 32 may extend into the mounting surface 26 (e.g., counterbore), or, in some embodiments, the pilot 32 may extend outwardly from the mounting surface 26. Although the pilot 32 is illustrated as being circular, in certain embodiments, the pilot 32 may be any suitable shape. Furthermore, the mounting surface 26 includes threaded apertures 34 and 36 to facilitate coupling the auxiliary system 27 to the PTO system 24. The mounting surface 26 also includes an opening 38 that may be coupled to the auxiliary system 27. For example, in some embodiments, the opening 38 may include a drain to enable hydraulic fluid to drain from a case drain of the auxiliary system 27 (e.g., the case drain of a hydraulic pump). As such, the opening 38 may be configured to enable hydraulic fluid to flow through the mounting surface 26 to a reservoir of the work vehicle 10.

A PTO shaft adaptor 40 may be coupled to the mounting surface 26 (e.g., inserted into the drive shaft 28) to facilitate use of different sized driven shafts. Accordingly, the PTO shaft adaptor 40 includes a male end 42 configured to mate with the drive shaft 28. The male end 42 has a diameter 44 that matches the diameter 30 of the drive shaft 28 to facilitate mating. For example, if the diameter 30 of the drive shaft 28 is approximately 1⅜ inches, then the diameter 44 of the male end 42 has a matching diameter of approximately 1⅜ inches. Likewise, if the diameter 30 of the drive shaft 28 is approximately 1¾ inches, then the diameter 44 of the male end 42 has a matching diameter of approximately 1¾ inches. Furthermore, the PTO shaft adaptor 40 includes a female end 46 configured to mate with a driven shaft of the auxiliary system 27. The female end 46 has a diameter 48 that may be any suitable size. For example, in certain embodiments, the diameter 48 may be approximately 1 inch.

The auxiliary system 27 may be any suitable system that may be coupled to the PTO system 24. For example, the auxiliary system 27 may be a hydraulic pump, a generator, an air compressor, or a water pump. Furthermore, the auxiliary system 27 includes a body 50 having components used to operate the auxiliary system 27. Moreover, a male driven shaft 52 extends from the auxiliary system 27, and is configured to mate with and to be driven by the PTO system 24. As illustrated, the driven shaft 52 has a diameter 54. In certain embodiments, the diameter 54 of the driven shaft 52 may match the diameter 30 of the drive shaft 28; however, in other embodiments, the diameter 54 of the driven shaft 52 may match the diameter 48 of the female end 46 of the shaft adaptor 40. In such embodiments, the diameter 54 may be approximately 1 inch. Furthermore, to attach the auxiliary system 27 to the PTO system 24, the PTO shaft adaptor 40 may be inserted within the drive shaft 28 of the PTO system 24, and the driven shaft 52 of the auxiliary system 27 may be inserted within the PTO shaft adaptor 40. Accordingly, the PTO system 24 may be used to drive the driven shaft 52 of the auxiliary system 27.

The auxiliary system 27 also includes a pilot 56 configured to mate with the pilot 32 of the PTO system 24. As discussed above, the pilot 56 is configured to facilitate lateral alignment of the PTO system 24 and the auxiliary system 27. As illustrated, the pilot 56 extends out from the auxiliary system 27; however, in other embodiments, the pilot 56 may extend into the auxiliary system 27. The auxiliary system 27 includes an opening 57 that may be coupled to the opening 38 of the PTO system 24. For example, in some embodiments, the opening 57 may include a case drain to enable hydraulic fluid to drain from the auxiliary system 27 and to enable hydraulic fluid to flow through the mounting surface 26 of the PTO system 24 to a reservoir of the work vehicle 10. The auxiliary system 27 also includes a mounting structure 58 used to secure the auxiliary system 27 to the PTO system 24. Furthermore, the mounting structure 58 includes an aperture 60 configured to align with the threaded aperture 36. During assembly, a fastener 62 (e.g., bolt, screw, etc.) is attached to the apertures 36 and 60 to secure the auxiliary system 27 to the PTO system 24. Furthermore, the mounting structure 58 includes an aperture 64 configured to align with the threaded aperture 34. Moreover, during assembly, a fastener 66 (e.g., bolt, screw, etc.) is attached to the apertures 34 and 64 to secure the auxiliary system 27 to the PTO system 24.

As illustrated, the auxiliary system 27 may be mounted to the PTO system 24 using fasteners 62 and 66, and without additional mounting structures (e.g., brackets, clamps, etc.). This is facilitated by the mounting surface 26 of the PTO system 24 having the same mounting configuration (e.g., hole pattern and pilot diameter) as the auxiliary system 27. Accordingly, the hole patterns and the pilot diameters of the mounting structure 58 and the mounting surface 26 are the same. In certain embodiments, the mounting surface 26 of the PTO system 24 and the mounting structure 58 of the auxiliary system 27 comply with Society of Automotive Engineers (SAE) standard J744. In other embodiments, the mounting surface 26 of the PTO system 24 and the mounting structure 58 of the auxiliary system 27 may comply with any proprietary or non-proprietary standard. For example, the mounting surface 26 of the PTO system 24 and the mounting structure 58 of the auxiliary system 27 may have any suitable hole patterns and pilot diameters. As such, the auxiliary system 27 may be easily installed and/or removed from the PTO system 24. Furthermore, an auxiliary system 27 may be swapped with another auxiliary system 27 in an efficient manner.

Figure 3:
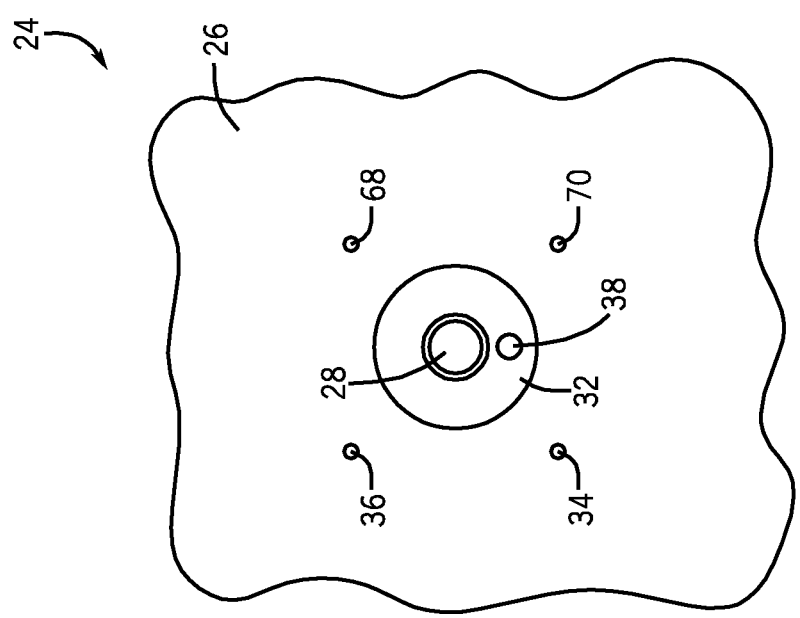
FIG. 3 is a back view of an embodiment of a four bolt mounting surface of a power takeoff system in accordance with the present disclosure.

FIG. 3 is a back view of an embodiment of a four bolt mounting surface 26 of the PTO system 24. As illustrated, the PTO system 24 includes the mounting surface 26 having four threaded apertures 34, 36, 68, and 70 for mounting an auxiliary system 27 having a mounting structure 58 with four corresponding apertures. The four threaded apertures 34, 36, 68, and 70 are configured to each receive a fastener (e.g., bolt, screw, etc.) for coupling the auxiliary system 27 to the mounting surface 26 of the PTO system 24. As may be appreciated, the threaded apertures 34, 36, 68, and 70 of the mounting surface 26 are configured to support the weight of the auxiliary system 27 and to resist rotation of the auxiliary system 27 relative to the mounting surface 26. In certain embodiments, the mounting surface 26 may comply with SAE standard J744. Accordingly, the mounting surface 26 may facilitate installation and/or removal of the auxiliary system 27.

Figure 4:
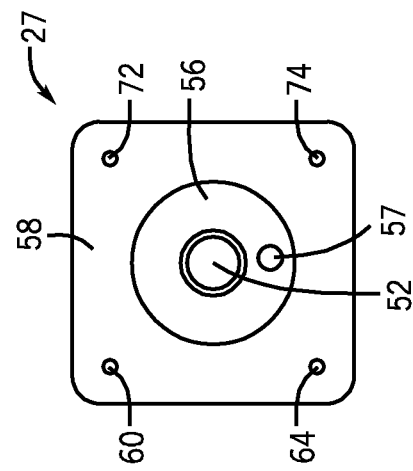
FIG. 4 is a front view of an embodiment of a four bolt mounting structure of an auxiliary system in accordance with the present disclosure.

FIG. 4 is a front view of an embodiment of a four bolt mounting structure 58 of the auxiliary system 27, which is configured to be coupled to the four bolt mounting surface 26 of the PTO system 24. Accordingly, the four bolt mounting structure 58 includes four apertures 60, 64, 72, and 74. Furthermore, in certain embodiments, the mounting structure 58 of the auxiliary system 27 may comply with SAE standard J744.

FIG. 5 is a back view of an embodiment of a two bolt mounting surface 26 of the PTO system 24. As illustrated, the PTO system 24 includes the mounting surface 26 having two threaded apertures 34 and 36 for mounting an auxiliary system 27 having a mounting structure 58 with two corresponding apertures. The two threaded apertures 34 and 36 are configured to each receive a fastener (e.g., bolt, screw, etc.) for coupling the auxiliary system 27 to the mounting surface 26 of the PTO system 24. As may be appreciated, the threaded apertures 34 and 36 of the mounting surface 26 are configured to support the weight of the auxiliary system 27, and to resist rotation of the auxiliary system 27 relative to the mounting surface 26. In certain embodiments, the mounting surface 26 may comply with SAE standard J744. Accordingly, the mounting surface 26 may facilitate installation and/or removal of the auxiliary system 27.

FIG. 6 is a front view of an embodiment of a two bolt mounting structure 58 of the auxiliary system 27, which is configured to be coupled to the two bolt mounting surface 26 of the PTO system 24. Accordingly, the two bolt mounting structure 58 includes two apertures 60 and 64. Furthermore, in certain embodiments, the mounting structure 58 of the auxiliary system 27 may comply with SAE standard J744. As may be appreciated, by incorporating one of the various mounting surfaces 26 described herein into the PTO system 24, auxiliary systems 27 may be quickly and easily installed onto and/or removed from the PTO system 24.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural vehicle comprising:
a power takeoff (PTO) device comprising a drive shaft and a mounting surface, the mounting surface comprising a plurality of threaded apertures for coupling an auxiliary system to the PTO device, and a pilot comprising a counterbore, the pilot configured to engage with a complimentary pilot of the auxiliary system to facilitate alignment of the PTO device with the auxiliary system, wherein the mounting surface and the auxiliary system have the same mounting configuration.

2. The agricultural vehicle of claim 1, comprising a PTO shaft adaptor coupled to the drive shaft, and configured to be coupled to a driven shaft of the auxiliary system.

3. The agricultural vehicle of claim 2, wherein the PTO shaft adaptor comprises a first end coupled to the drive shaft and a second end configured to be coupled to the driven shaft, and wherein a first shaft diameter of the first end is different than a second shaft diameter of the second end.

4. The agricultural vehicle of claim 1, wherein the plurality of threaded apertures comprises four threaded apertures.

5. The agricultural vehicle of claim 1, wherein the mounting configuration comprises a hole pattern and a pilot diameter.

6. The agricultural vehicle of claim 1, wherein the mounting configuration complies with Society of Automotive Engineers (SAE) standard J744.

7. The agricultural vehicle of claim 1, wherein the auxiliary system comprises a hydraulic pump.

8. A power takeoff (PTO) device for an agricultural vehicle comprising:
a drive shaft; and
a mounting surface comprising a plurality of threaded apertures for coupling an auxiliary system comprising a hydraulic pump to the PTO device, and a pilot configured to engage with a complimentary pilot of the auxiliary system to facilitate alignment of the PTO device with the auxiliary system, wherein the mounting surface and the auxiliary system have the same mounting configuration, and wherein the mounting surface comprises at least one drain opening configured to be coupled to a case drain of the hydraulic pump.

9. The PTO device of claim 8, wherein the at least one drain opening is configured to enable hydraulic fluid to flow through the mounting surface.

10. The PTO device of claim 8, wherein the mounting configuration complies with Society of Automotive Engineers (SAE) standard J744.

* * * * *